United States Patent [19]  [11] 4,209,397
Green et al.  [45] Jun. 24, 1980

[54] FLOCCULANTS FOR AQUEOUS SYSTEMS

[75] Inventors: Harold A. Green, Havertown, Pa.; John J. Merianos, Jersey City, N.J.; Alfonso N. Petrocci, Glen Rock, N.J.; Morris Weinstein, Paramus, N.J.

[73] Assignee: Kewanee Industries, Bryn Mawr, Pa.

[21] Appl. No.: 7,948

[22] Filed: Jan. 31, 1979

[51] Int. Cl.$^2$ .......................... B01D 21/01; C02B 1/20
[52] U.S. Cl. ..................................................... 210/54
[58] Field of Search ................... 210/42 R, 47, 51–54; 260/567.6 P

[56] References Cited

U.S. PATENT DOCUMENTS

| 3,673,164 | 6/1972 | Jones et al. | 210/54 |
| 3,874,870 | 4/1975 | Green et al. | 424/78 |
| 3,928,448 | 12/1975 | Ballweber et al. | 210/54 |
| 3,931,313 | 1/1976 | Green et al. | 260/567.6 P |
| 4,027,020 | 5/1977 | Green et al. | 260/567.6 P |
| 4,055,712 | 10/1977 | Green et al. | 260/567.6 P |

Primary Examiner—Benoît Castel
Assistant Examiner—Peter A. Hruskoci
Attorney, Agent, or Firm—Arthur A. Jacobs

[57] ABSTRACT

A method of producing floc in an aqueous system by the addition to said system of a capped or terminated quaternary ammonium compound or mixture of such compounds.

8 Claims, No Drawings

FLOCCULANTS FOR AQUEOUS SYSTEMS

This invention relates to flocculants and coagulants in aqueous systems. The addition of a flocculant or coagulant to liquid systems is one of the methods by which such systems may be clarified. An effective flocculant causes emulsified, dispersed, or suspended impurities to separate and settle out so that subsequent decantation or filtration yields a liquid that is relatively free from the impurities.

In some industrial operations where the liquid circulates in a closed system it is almost imperative to separate the emulsified, dispersed, or suspended impurities before the liquid is introduced into the closed recirculatory system because, otherwise, slow precipitation of the impurity would tend to block the line completely or, at least, act as a barrier to satisfactory liquid flow.

PRIOR ART

U.S. Pat. No. 3,928,448 discloses that polyquaternary ammonium compounds of formula

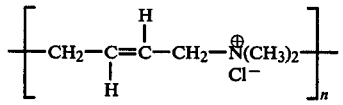

in which n is sufficiently large to give the polymer an intrinsic viscosity of between 0.04 and 0.85, may be used as a flocculant or coagulant for emulsified, dispersed, or suspended material in aqueous systems.

The method of producing these polymeric quaternary ammonium compounds involved the simple addition of dimethylamine to trans1,4-dichloro-2-butene.

U.S. Pat. No. 3,874,870 discloses that polyquaternary ammonium compounds of formula

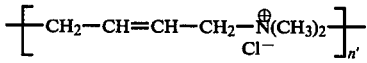

where n is an integer from about 2 to about 30, have antimicrobial properties. These polymeric quaternary compounds were synthesized by a reaction between Cl CH$_2$ CH=CH CH$_2$Cl and (CH$_3$)$_2$ N—CH$_2$CH=CH—CH$_2$N(CH$_3$)$_2$.

Neither one of the above-mentioned methods for synthesizing these polyquaternary compounds provides means for terminating the growing chain. Therefore the formula for the product might be represented better by the formula

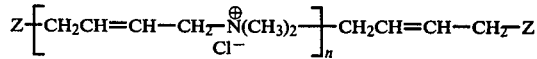

in which Z is either Cl or —N(CH$_3$)$_2$, since these are the only possible terminal groups.

U.S. Pat. Nos. 3,931,319 and 4,027,020 disclose polyquaternary ammonium compounds which may be represented by the formula

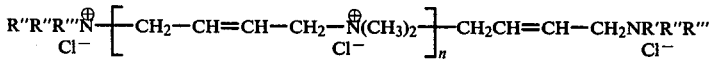

where n is an integer from about 2 to about 30. Close inspection of these formulas discloses, however, that the polymers they represent differ from those of the previously mentioned formulas in one very important respect, namely, the latter compounds contain chains which are terminated by quaternary ammonium groups, thereby making additional chain growth impossible, whereas the former compounds have chains which terminate in either a halogen or a tertiary amine, thereby permitting further subsequent chain growth.

U.S. Pat. No. 3,931,319 discloses one method of synthesizing the latter compounds, namely by synthesizing chains which are terminated by halogen atoms and then causing these halogen-terminated chains to react with a tertiary amine in a second step. The products were named "capped" polymers.

U.S. Pat. No. 4,027,020 discloses another method of synthesizing these polymers, namely by causing 1,4-dihalo-2-butene to react with 1,4-bis-dimethylamino-2-butene in the presence of from 5 to 20% of a mono 3° amine in a one-step process. These products were named "randomly terminated" polymers. The two polymeric products of the last two syntheses have only minor differences between them in many of their chemical and physical properties due, in the main, to the different distribution of molecular weights of their chains.

DESCRIPTION OF THE INVENTION

It has now been discovered that both the "capped" and "terminated" polymeric quaternary ammonium compounds are excellent flocculants and coagulants in aqueous systems. We have, in addition, discovered that, quite unexpectedly, the "capped" and "terminated" polymers are superior in their behavior as flocculants and coagulants to the "non-capped", or "non-terminated" polymers. And we have, furthermore, discovered that both the "capped", and the corresponding "terminated" polymers have flocculant activities which are approximately the same since they cannot be distinguished from each by the method of testing for flocculation described below.

The following examples illustrate the invention:

Example 1

"Capped" polymers were prepared as follows: To 42.6 grams of 1,4-bis-dimethylamino-2-butene (0.3 mole) dissolved in 100 ml. of water, there was added dropwise 50.0 grams of 1,4-dichloro-2-butene (0.4 mole) with constant stirring. The rate of addition was maintained at a rate to keep the exothermic reaction at a temperature of from about 60° C. to about 70° C. When addition was complete, the reaction mixture was heated on a steam bath at about 90° C. to about 95° C. for more than two hours. Then it was cooled to 20° C. and extracted with three 100 ml. portions of ethyl ether to remove the unreacted 1,4-dichloro-2-butene, and the residue was warmed in vacuum to remove residual ether.

The aqueous residue was analysed for total chlorine and for ionic chloride. The difference represented the quantity of terminal organically-bonded chlorine on the polymeric chains.

Calculations showed (in this case) that the equivalent of 0.03 mole of chlorine terminal atoms remained on the polymeric chains. Therefore, 4.5 grams (0.03 mole) of triethanolamine was added to the aqueous layer and the mixture heated on a steam bath for two more hours at a temperature of from about 90° C. to about 95° C. The reaction mixture was then analysed for total polymer concentration. It contained about 50% active material. The solution was used in subsequent experiments.

The same procedure was repeated using 0.03 mole of the following tertiary amines instead of triethanolamine: trimethylamine, octyldimethylamine, dodecyldimethylamine, stearyldimethylamine, N-methylmorpholine, N-methylpiperidine, and benzyldimethylamine.

The chemical transformations may be represented as follows: excess

ClCH₂CH=CH—CH₂—Cl + (CH₃)₂N—CH₂CH=CHCH₂—N(CH₃)₂ —>

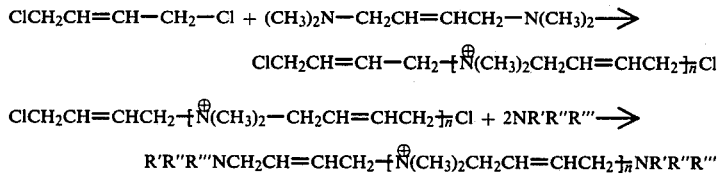

ClCH₂CH=CHCH₂—[N⁺(CH₃)₂—CH₂CH=CHCH₂]ₙCl + 2NR'R"R''' —>

R'R"R'''NCH₂CH=CHCH₂—[N⁺(CH₃)₂CH₂CH=CHCH₂]ₙNR'R"R'''

Example 2

"Terminated" polymers were prepared as follows: 28.4 grams of 1,4-bis-dimethylamino-2-butene (0.2 mole) and 3.0 grams of triethanolamine (0.02 mole) were dissolved in about 55.5 grams of water in a round-bottom flask fitted with a stirrer and reflux condenser, and 25.63 grams of 1,4-dichloro-2-butene (0.205 mole) were added slowly while the mixture was stirred. The reaction mixture was then heated to about 60° C.–70° C. and maintained at that temperature, with stirring, for about 6 hours. The reaction was over 98% complete, as indicated by ionic chloride analysis. The product contained about 50%, by weight, of the "terminated" polymer and was used is subsequent experiments.

The procedure was repeated using 0.02 mole of the following tertiary amines instead of triethanolamine: trimethylamine, octyldimethylamine, dioctylmethylamine, dodecyldimethylamine, stearyldimethylamine, N-methylmorpholine, N-methylpiperidine and benzyldimethylamine.

The chemical reaction may be represented as follows:

ClCH₂CH=CHCH₂—Cl +

(CH₃)₂NCH₂CH=CHCH₂—N(CH₃)₂ + 2NR'R"R''' —>

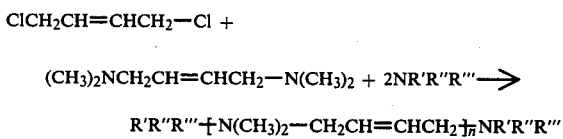

Example 3

The compounds were tested for flocculation as follows:

Into a 1-liter graduated cylinder was placed about 1000 ml. of an aqueous suspension containing 300 ppm. of bentonite (#670 from Whittaker, Clark and Daniels, South Plainfield, N.J.), adjusted to a pH of 3.1. A sufficient quantity of polymer to be tested was added to bring its active concentration to 1 ppm. Then the cylinder was inverted twice and the solution checked for flocs. If no flocs appeared, additional polymer was added to increase its concentration by 1 ppm. and the solution again checked for flocs after 2 inversions. In this manner of testing, the concentration of polymer was increased by 1 ppm. at a time until flocs appeared. The tests were repeated at a pH of 7.

The following polymers were tested:
1. The polymer of U.S. Pat. No. 3,874,870.
2a. The polymer of U.S. Pat. No. 3,874,870 after it was "capped" by triethanolamine.
2b. The polymer of U.S. Pat. No. 3,874,870 after it was "terminated" by triethanolamine.
3a. The polymer of U.S. Pat. No. 3,874,870 after it was "capped" by trimethylamine.
3b. The polymer of U.S. Pat. No. 3,874,870 after it was "terminated" by trimethylamine.
4a. The polymer of U.S. Pat. No. 3,874,870 after it was "capped" by N-methylmorpholine.
4b. The polymer of U.S. Pat. No. 3,874,870 after it was "terminated" by N-methylmorpholine.
5a. The polymer of U.S. Pat. No. 3,874,870 after it was "capped" by octyldimethylamine.
5b. The polymer of U.S. Pat. No. 3,874,870 after it was "terminated" by octyldimethylamine.
6a. The polymer of U.S. Pat. No. 3,874,870 after it was "capped" by dioctylmethylamine.
6b. The polymer of U.S. Pat. No. 3,874,870 after it was "terminated" by dioctylmetnylamine.
7a. The polymer of U.S. Pat. No. 3,874,870 after it was "capped" by dodecyldimethylamine.
7b. The polymer of U.S. Pat. No. 3,874,870 after it was "terminated" by dodecyldimthylamine.

At pH 3.1, the polymers identified by 2a, 2b, 3a, 3b, 4a and 4b produced flocs at a concentration of 2 ppm. At pH 7, these polymers produced flocs at concentrations ranging from about 3 ppm to about 4 ppm. None of these polymers caused foaming.

At pH 3.1, the polymers identified by 5a, 5b, 6a, 6b, 7a and 7b produced flocs at a concentration of about 2 ppm to about 3 ppm. At pH 7 they produced flocs at concentrations ranging from about 3 ppm to about 4 ppm. These polymers produced some foam during the tests.

At pH 3.1, polymer 1 did not produce flocs until it was at a concentration of 4.5 ppm, and at pH 7 it did not produce flocs at less than a concentration of 6.5 ppm. It is, therefore, apparent that, the "capped" or "terminated" polymers are superior flocculants to the uncapped or non-terminated polymers.

The invention claimed is:
1. A method of producing floc which comprises adding to an aqueous system containing emulsified, dispersed or suspended materials, an effective amount of a polymeric quaternary ammonium compound or mixtures thereof of formula:

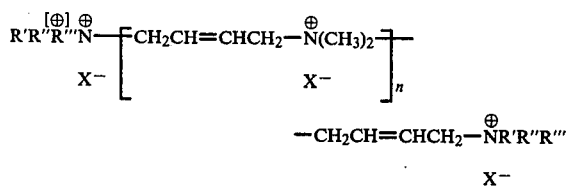

wherein (1) R′ R″ and R‴ may be the same or different alkyl groups of from 1 to 20 carbon atoms, selectively substituted by from 1 to 2 hydroxyl groups and selectively containing from 1 to 2 olefinic double bonds, or (2) R′ and R″ may be the same or different alkyl groups of from 1 to 20 carbon atoms selectively substituted by from 1 to 2 hydroxyl groups and selectively containing from 1 to 2 olefinic double bonds, and R‴ represents a benzyl group, or (3) R′ is an alkyl group of from 1 to 20 carbon atoms selectively substituted by from 1 to 2 hydroxyl substituents and selectively containing from 1 to 2 olefinic double bonds and R″ R‴ N represents a N-heterocyclic group of from 5 to 7 atoms, or (4) R′ is an alkyl group of from 1 to 20 carbon atoms selectively substituted by from 1 to 2 hydroxyl substituents and selectively containing from 1 to 2 olefinic double bonds and R″ R‴ N taken together with an oxygen atom represents a N-morpholino group; X is a halogen atom or atomic weight above 30; and n is an integer of from 2 to 30 to flocculate said materials.

2. The method of claim 1 wherein R′=R″R‴=—CH$_2$CH$_2$OH.

3. The method of claim 1 wherein R′=R″R‴=—CH$_3$.

4. The method of claim 1 wherein R′=R″=—CH$_3$, and R‴=—C$_8$H$_{17}$.

5. The method of claim 1 wherein R′=R″—CH$_3$, and R‴=—C$_{12}$H$_{25}$.

6. The method of claim 1 wherein R′=R″=CH$_3$ and R‴=—C$_{18}$H$_{37}$.

7. The method of claim 1 wherein R′=CH$_3$, and R″R‴ N represents the N-methylmorpholino group.

8. The method of claim 1 wherein R′=CH$_3$ and R″=R‴=—C$_8$H$_7$.

* * * * *